United States Patent [19]

Christiansen et al.

[11] Patent Number: 4,685,295

[45] Date of Patent: Aug. 11, 1987

[54] CONTROL DEVICE FOR A HYDRAULICALLY OPERATED CONSUMER

[75] Inventors: Preben Christiansen, Nordborg; Christian Eskildsen, Nybol; Svend E. Thomsen, Langeso, all of Denmark

[73] Assignee: Danfoss A/S, Nordborg, Denmark

[21] Appl. No.: 782,436

[22] Filed: Oct. 1, 1985

[30] Foreign Application Priority Data

Oct. 3, 1984 [DE] Fed. Rep. of Germany ....... 3436246

Dec. 6, 1984 [DE] Fed. Rep. of Germany ....... 3444455

[51] Int. Cl.[4] ............................................. F16D 31/02

[52] U.S. Cl. ......................................... 60/459; 91/421

[58] Field of Search ................. 60/459, 468, 445, 450, 60/452; 91/421

[56] References Cited

U.S. PATENT DOCUMENTS

| | | | |
|---|---|---|---|
| 3,994,133 | 11/1976 | Pfeil et al. | 60/468 X |
| 4,011,721 | 3/1977 | Yip | 60/450 X |
| 4,118,149 | 10/1978 | Hagberg | 60/468 X |
| 4,285,195 | 8/1981 | Budzich | 60/450 |

*Primary Examiner*—Edward K. Look

*Attorney, Agent, or Firm*—Wayne B. Easton

[57] ABSTRACT

The invention relates to a control unit for a hydraulically operated consumer of the type which is used for operating heavily intermittently and loaded machines such as cranes. The consumer is fed in accordance with a load sensing function with pressurized fluid which depends on the opening of the supply valve but is independent of load pressure variations. The invention is directed to minimizing the lagging of the adjustments to different loading conditions to provide more rapid stabilization. This is done by providing the signal conduit with three branches between the inlet and outlet lines to form a pressure dividing arrangement in which the signal pressure is no longer equal to the load pressure but is composed of parts of the load pressure and the output of a pressure regulating valve in the inlet line of the unit. Upon fluctuation in the load the amount of flow is not kept constant but instead decreases with an increasing load and increases with a drop in the load. This has a damping effect on the system so that a stable condition is rapidly reached.

6 Claims, 11 Drawing Figures

CONTROL DEVICE FOR A HYDRAULICALLY OPERATED CONSUMER

The invention relates to a control device for a hydraulically operated consumer, which can be supplied with pressure fluid on the upstream side by a source of compressed fluid such as a pump by way of a supply conduit, a pressure compensating valve, a connecting conduit, an upstream valve of control valve means, and an upstream consumer conduit, and which is connectable to a container by way of a downstream consumer conduit, a downstream valve of the control valve means, and a return conduit, comprising a signal conduit having a first connecting branch connected to the upstream consumer conduit and being at a signal pressure which acts on the pressure compensating valve in the same sense as a spring but oppositely to a compensating pressure tapped from the connecting conduit, wherein particularly the source of pressure fluid comprises a regulating apparatus which is also dependent on the signal pressure.

Such a control device is know from DE-AS 25 14 624. The load pressure tapped from the consumer conduit by way of the signal conduit controls the pressure compensating valve in such a way that the same pressure drop predetermined by the spring of the compensating valve always obtains at the upstream valve. This means that the consumer is fed with an amount of pressure fluid which depends on the width of the opening of the upstream valve and which is independent of whether the load pressure varies. A prerequisite for this is that an adequately high pressure will always obtain at the inlet to the pressure compensating valve. This can be achieved in that the pressure fluid is always supplied in an appropriately high excess quantity or in that the flow is regulated depending on the load. For this purpose, an appropriate regulating apparatus can likewise be controlled by the signal pressure or, in the case of a plurality of consumers operating in parallel, by the signal pressure that signifies the highest load.

Such a control device enables the consumer to be operated substantially independently of the load and supply. The movement to be monitored is therefore protected from external influences. However, this type of regulation which is also often known as "load sensing" has a long introductory period because of its complexity, for example when, in the case of a crane, the load suddenly jumps from zero to a predetermined value when lifted.

The invention is based on the problem of developing a control device of the aforementioned kind so that the controlled function is stabilised more rapidly.

This problem is solved according to the invention in that the signal conduit is connected by way of a second connecting branch to the connecting conduit and by way of a third connecting branch to the return conduit, and that, each connecting branch contains a throttle to form a pressure dividing arrangement.

In this construction, the signal pressure is no longer equal to the load pressure and it is composed of parts of the load pressure and parts of the compensating pressure. Upon fluctuation in the load, therefore, the amount of flow is not kept constant but it rather decreases with an increasing load and increases with a drop in the load. This has a damping effect on the system so that a stable condition is reached rapidly.

It is favourable for at least some of the throttles to be adjustable. In this way, the dependence can be varied within wide limits on the one hand by the load pressure and on the other hand by the compensating pressure and consequently one can achieve optimum adaptation for every individual case. It is favourable to obtain rapid stabilisation with the least possible load dependence. If desired, at least some of the throttles can be blocked or dispensed with.

In a preferred embodiment, the throttle in the third connecting branch is adjustable together with the upstream and downstream valve but in the opposite sense to the throttling function. The signal pressure is therefore increased all the more, the wider the upstream and downstream valves open. In the region of larger amounts of flow, this leads to a rise in the signal pressure and greater dependence on the compensating pressure and thus greater damping which is desired for more rapid movements of the consumer.

It is also desirable for the first connecting branch to be provided with a check valve which opens towards the upstream consumer conduit. In this way, should the load pressure exceed the compensating pressure because of an inadequate supply of pressure fluid, one prevents the signal pressure from assuming excessively high values and liquid draining off from the consumer to the container (tank).

If, in accordance with DE-AS 25 14 624, the control device is provided with double-acting control valve means by which the consumer conduits are alternately connectable to the upstream and downstream sides and provided with a signal conduit which is connected to both consumer conduits by way of a respective first connecting branch which is alternately blockable by the control valve means, it is advisable to provide a complete pressure dividing arrangement at least for the one operating direction of the consumer and for at least the third connecting branch of this arrangement to be blockable by the control valve means in the other operating direction. In this way, the desired damping control can also be employed for consumers which are operable in two directions. In the respective other operating direction there will then be normal load-sensing regulation or likewise damping regulation in accordance with the invention.

The latter can for example be achieved in that two complete pressure dividing arrangements are provided and all three respective connecting branches of these arrangements are alternately blockable by the control valve means. Since all connecting branches are blocked from the associated conduits when not in use, the two pressure dividing arrangements can be adjusted completely independently from each other.

In a control device having a common pressure compensating valve for both operating directions, it is also possible to provide two pressure dividing arrangements with a common second connecting branch, only the first and third connecting branches of these arrangements being alternately blockable by the control valve means. This results in a permanent flow of leakage oil over the second connecting branch, that is to say even in the neutral position. However, because of the omission of a second connecting branch and the two blocking elements, one achieves considerable simplification in the construction.

If one starts with the control device illustrated in FIG. 2 of DE-AS 25 14 624, in which the control valve means comprise an axial slide having collars co-operating with annular grooves in a bore, the bore comprising a central annular groove connected to the connecting conduit and, to both sides thereof, a respective consumer conduit connection adjacent to each other, a respective return annular groove and a respective signal annular groove connected to the signal conduit and the axial slide being provided with a central collar and, to both sides thereof, a respective return collar adjacent to each other, a signal collar and a limiting collar, there being two passages in the axial slide respectively connecting the groove between the central collar and the return collar to the groove between the signal collar and the limiting collar, wherein a respective one of the last-mentioned grooves comes into communication with the adjacent signal annular groove upon movement of the axial slide out of the neutral position, even further simplifications can be effected. In particular, the two passages can each comprise a first throttle and, to form a respective third throttle, the return collars can have a cross-section converging towards the adjacent signal collar. In this way, significant components of the pressure dividing arrangement can be accommodated in the axial slide that is already present.

In another construction, the bore comprises on both sides beyond the signal annular groove a switching annular groove which is connected to the connecting conduit by a respective second connecting branch and the axial slide is provided with an end collar on both sides beyond the limiting collar. Each passage also has a connection to the groove between the limiting collar and the end collar and, upon movement of the axial slide out of the neutral position, this groove comes into communication with the switching annular groove. In this case, additional switching means are provided at both ends of the axial slide in order to connect the respective correct second connecting branch to the signal conduit.

Another alternative is for the passages each to have an extension which leads to the central collar and contains a second throttle and for their inlet orifices at the collar periphery to lie just within the width of the central annular groove in the neutral position. By means of these features, all the parts of the pressure dividing arrangement can be accommodated in the axial slide.

It is also recommended that the throttle in the first connecting branch and/or the throttle in the third connecting branch be bridged by a spring-biased check valve which opens in the flow direction of the associated throttle.

With the aid of the check valves, one can limit the pressure drop at the associated throttle and thus a characteristic parameter which determines the power of the connected consumer. The check valve in the first connecting branch ensures that the flow to the inlet of the consumer will not exceed a maximum value. The check valve in the third connecting branch ensures that the pressure at the inlet of the consumer will not exceed a maximum value. Both limitations are achieved with a comparatively small valve.

It is particularly favourable for the force of the spring biasing the check valve to be adjustable. The stated maximum values can then be set corresponding to the current operating conditions. Since different first and third connecting branches are generally used for both operating directions, the stated maximum values can likewise be set differently for the two operating directions.

Preferred examples of the invention will now be described in more detail with reference to the drawing wherein.

Figure 1:
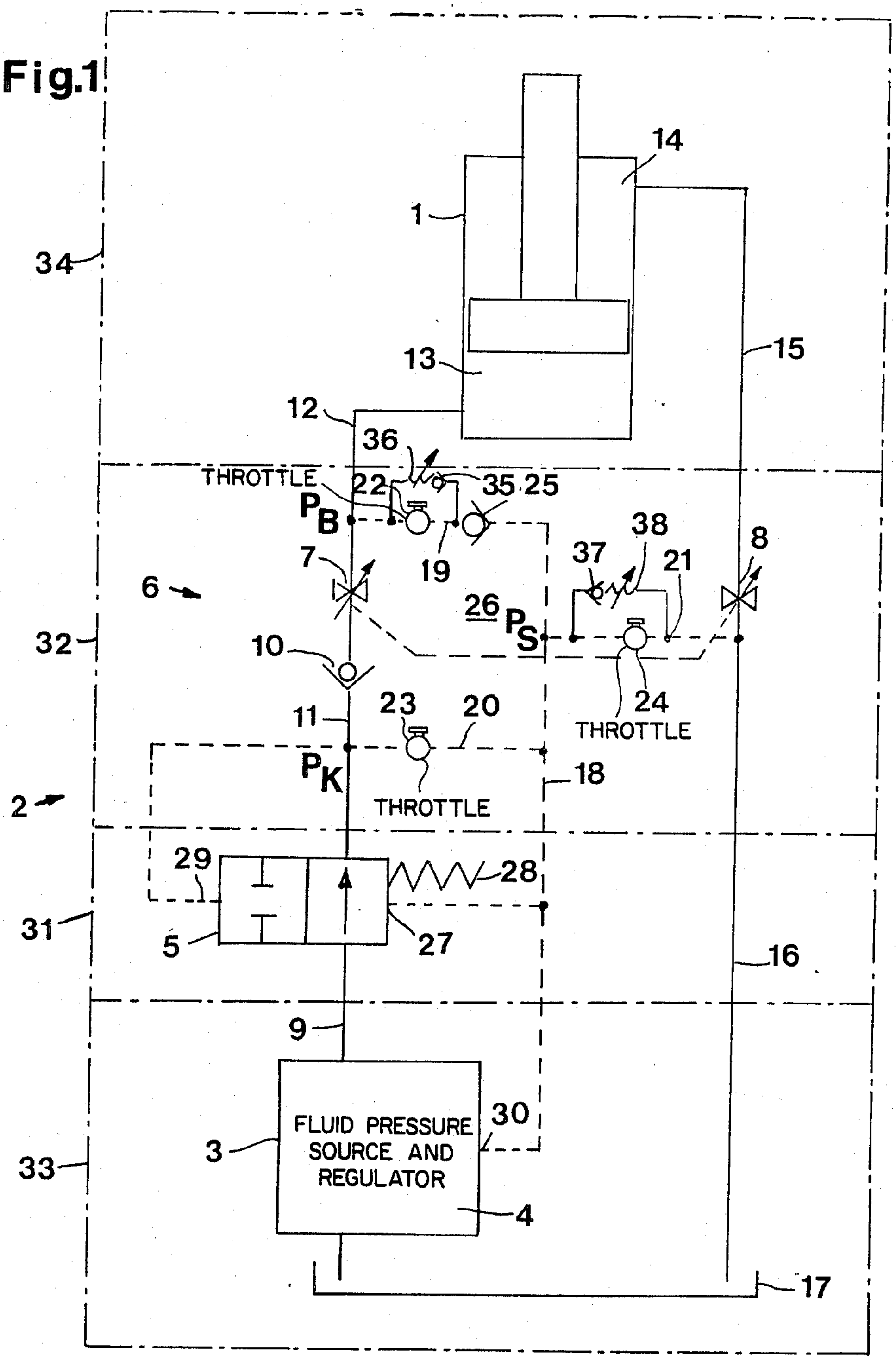
FIG. 1 is a diagrammatic circuit of the control device according to the invention for one direction of movement of the consumer.

The simplified circuit diagram of FIG. 1 illustrates a hydraulic consumer 1 which is supplied by way of a control device 2 with pressure fluid from a pressure fluid source 3. The latter comprises a regulating device 4 with which the amount of flow can be adjusted. For example, one can use a pump with variable compression or a pump with constant compression and a regulatable delivery valve. The control device 2 comprises a pressure compensating valve 5 and control valve means 6 comprising at least an upstream valve 7 and a downstream valve 8 which can be adjusted in unison and in the same sense from the outside.

The pressure compensating valve 5 and the control valve means 6 may comprise an axial or rotary slide or be of any other desired form.

The pressure fluid travels from the pressure fluid source 3 through a conduit 9, the pressure compensating valve 5, a connecting conduit 11 having a check valve 10, the upstream valve 7 and an upstream consumer conduit 12 into the supply chamber 13 of the consumer. The delivery chamber 14 is connected to a container 17 by way of a downstream consumer conduit 15, the downstream valve 8 and a return conduit 16.

A signal conduit 18 communicates by way of a first connecting branch 19 to the upstream consumer conduit 12, by way of a second connecting branch 20 to the connecting conduit 11 and by way of a third connecting branch 21 to the return conduit 16. These three connecting branches each comprise a throttle referred to as the first throttle 22, the second throttle 23 and the third throttle 24. The second throttle 23 is manually adjustable. The third throttle 24 is adjustable together with the upstream and downstream valves 7 and 8 but opposite to the throttling function. The first connecting branch also comprises a check valve 25 which opens towards the upstream consumer conduit 12.

The three throttles, 22, 23 and 24 form a voltage dividing arrangement 26 which ensures that a signal pressure $P_S$ obtains in the signal conduit 18 that represents a mixed function composed of the load pressure $P_B$ in the upstream connecting conduit 12 and the compensating pressure $P_K$ in the connecting conduit 11. This signal pressure $P_S$ is fed to a control input 27 of the pressure compensating valve 5 and there operates in the same sense as a spring 28 but in the opposite sense to the compensating pressure $P_K$ introduced by way of a control input 29. The compensating pressure is therefore always larger than the signal pressure $P_S$ by a constant value predetermined by the spring 28. The signal pressure is also fed to the control input 30 of the regulating device 4 so that, upon an increase in the demand, a greater amount of pressure fluid will be delivered.

In practice, the control device 2 can consist of two modules of which the module 31 comprises the pressure compensating valve 5 and the module 32 the control valve means 6 and both modules comprise the associated parts of the signal conduit 18. These modules are connected between a supply portion 33 and a consumer portion 34.

In addition, the throttle 22 in the first connecting branch 19 is bridged by a check valve 35 which is loaded by an adjustable spring 36. The throttle 24 in the third connecting branch 21 is bridged by a check valve 37 which is biased by an adjustable spring 38. Both check valves open in the flow direction of the associated throttle, that is to say in the direction of the signal conduit 18 towards the upstream consumer conduit 12 or return conduit 16.

The diagrammatic circuit of FIG. 1 is only suitable for the upward direction of movement of the consumer 1. The downward movement takes place conventionally, for example in the manner evident in conjunction with FIGS. 8 to 11.

Figure 2:
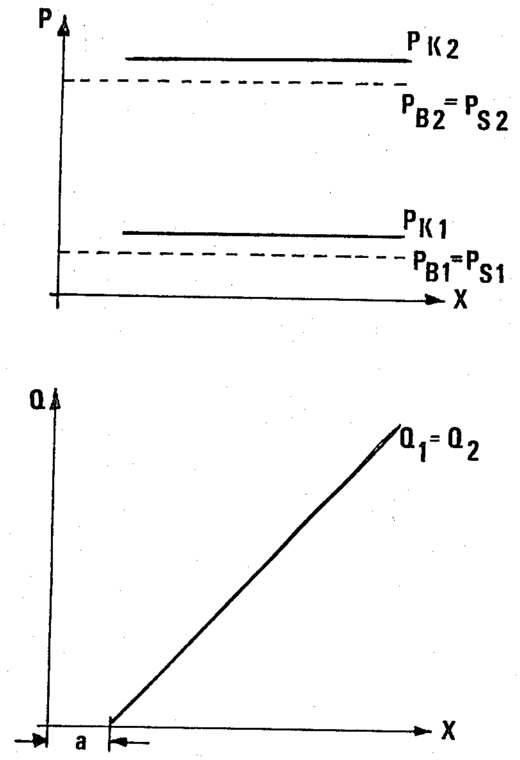
FIG. 2 illustrates, above one another, the pressure P and the amount of flowing medium Q against the distance x of movement of the control valve means when the second and third connecting branches are closed.
Figure 3:
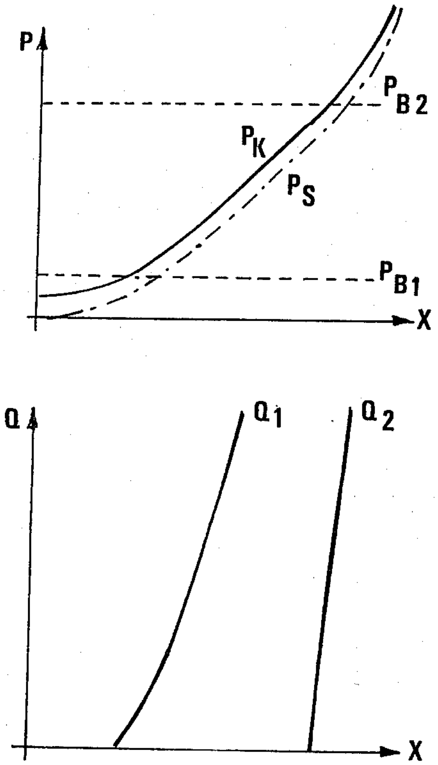
FIG. 3 shows the same values as in FIG. 2 when the first connecting branch is closed.
Figure 4:
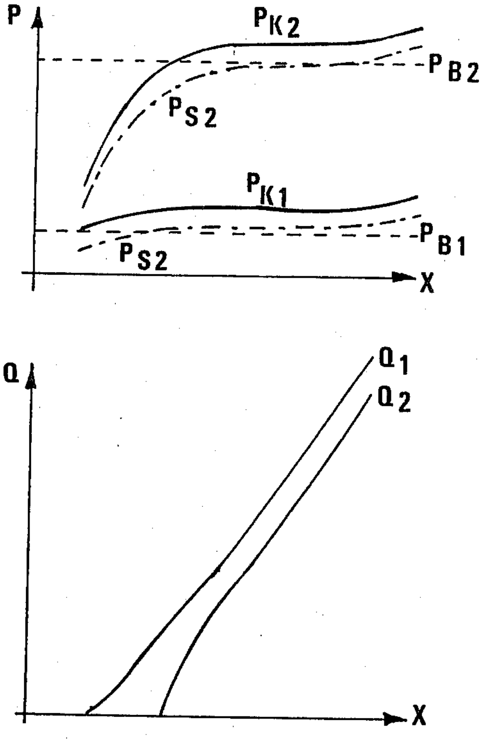
FIG. 4 shows the same values as in FIG. 2 when the throttles in all three connecting branches are operative.

In the following consideration of the manner of operation, it is assumed that the control means comprise an axial slide of the kind shown in FIGS. 8 to 11. In FIGS. 2 to 4, the upper graph shows the pressure P and the lower graph the amount of pressure fluid Q per unit time, in each case plotted against the distance x by which the axial slide is displaced. The graphs correspond to displacement from the neutral position in one direction. A sudden dead distance a is necessary before the valve opens. Thereafter, the open cross-section of the valve increases linearly with the displacement.

FIG. 2 considers the extreme case in which the throttles 23 and 24 are completely closed. This corresponds to the normal load-sensing operation. The signal pressure $P_S$ is equal to the load pressure $P_B$. The compensating presure $P_K$ is higher by a predetermined amount. With a low load pressure $P_{B1}$, one therefore obtains low pressure values $P_{K1}$ and with a higher load pressure $P_{B2}$ one obtains higher pressure values $P_{K2}$. These are constant over the entire distance x of displacement. This means that the flow quantity $Q_1$ at low load is precisely equal to the flow quantity $Q_2$ at high load.

FIG. 3 describes the other extreme case in which the throttle 22 is closed. The signal pressure $P_S$ is then a fraction of the compensating pressure $P_K$ that is predetermined by the respective resistances of the throttles 23 and 24. With an increase in the valve opening, the compensating pressure and thus the signal pressure $P_S$ will also rise. The characteristic curves for the flow quantity $Q_1$ at a small load pressure $P_{B1}$ and for the flow quantity $Q_2$ at higher load pressure $P_{B2}$ are very steep and wide apart. The corresponding characteristic curves for intermediate load pressures follow a similar course between the curves for the $Q_1$ and $Q_2$. This means that considerable changes in quantity occur upon a change in the load pressure.

FIG. 4 shows the mixed form between the two extremes, all three throttles 22, 23 and 24 being open. It will be seen that the pressure curve for $P_S$ is still approximately but no longer exactly horizontal at least at a low load pressure $P_{B1}$ and in the central adjustment range also at a higher load pressure $P_{B2}$. This leads to the characteristic curves shown in the lower graph for the flow quantities $Q_1$ and $Q_2$ which still show the substantial independence of supply of FIG. 2 but exhibit a certain amount of dependence on load.

Figure 5:
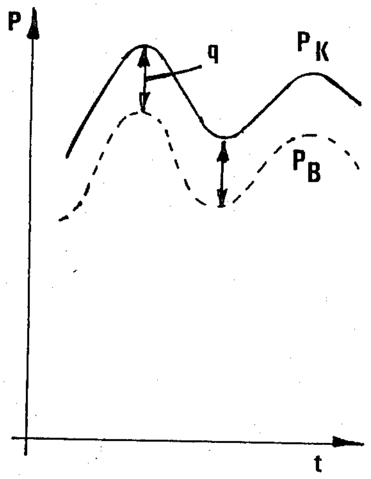
FIG. 5 is a graph of the introduction of the pressure against time with a setting in accordance with FIG. 2.

With a setting as in FIG. 2, FIG. 5 shows the dynamic behaviour against time during the initial stages. In each case, the compensating pressure $P_K$ and the load pressure $P_B$ are plotted against time. By reason of the complete independence of load, the amount of flow which is almost proportional to the arrow q remains substantially constant. This brings about no damping.

Figure 6:
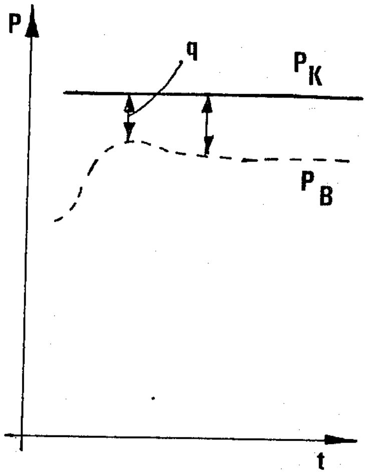
FIG. 6 is the FIG. 5 graph for a setting in accordance with FIG. 3.

FIG. 6 shows the same conditions for the setting of FIG. 3. There is very rapid damping. However, practically no quantity regulation is possible any longer as shown in the lower graph of FIG. 3.

Figure 7:
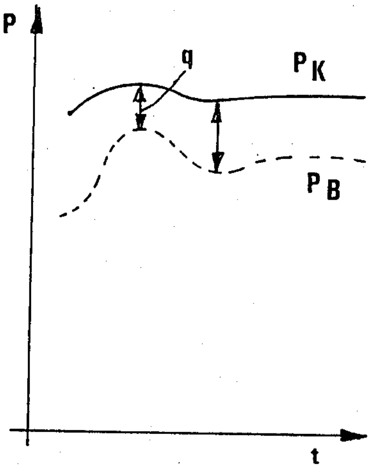
FIG. 7 is the FIG. 5 graph for a setting in accordance with FIG. 4.

In a mixture of both effects according to FIG. 4, one obtains the graph of FIG. 7. Here, the size of the arrow q decreases with an increase in load pressure and increases with a reducing load pressure to result in useful damping. At the same time, however, regulation is possible substantially independently of the supply over the entire range of adjustment.

The check valve 35 opens when the pressure drop at the throttle exceeds a value set by the spring 36. The pressure drop therefore has an upper limit. The signal pressure $P_S$ can exceed the load pressure $P_B$ only to the extent of this pressure drop. The compensating pressure $P_K$ is held above this signal pressure $P_S$ by a value corresponding to the spring 28. Even if the valve 7 were to be opened further, the pressure compensating valve 5 will ensure that the set maximum amount of flow is not exceeded.

The check valve 37 will open when the pressure drop at the throttle 24 exceeds a value set by the spring 38. The signal pressure $P_S$ is therefore higher than the container pressure by the amount of this pressure drop. The compensating pressure $P_K$ exceed the signal pressure $P_S$ by an amount predetermined by the spring 28. Since this pressure is fixed, the load pressure $P_B$ can likewise not exceed an upper limit.

Figure 8:
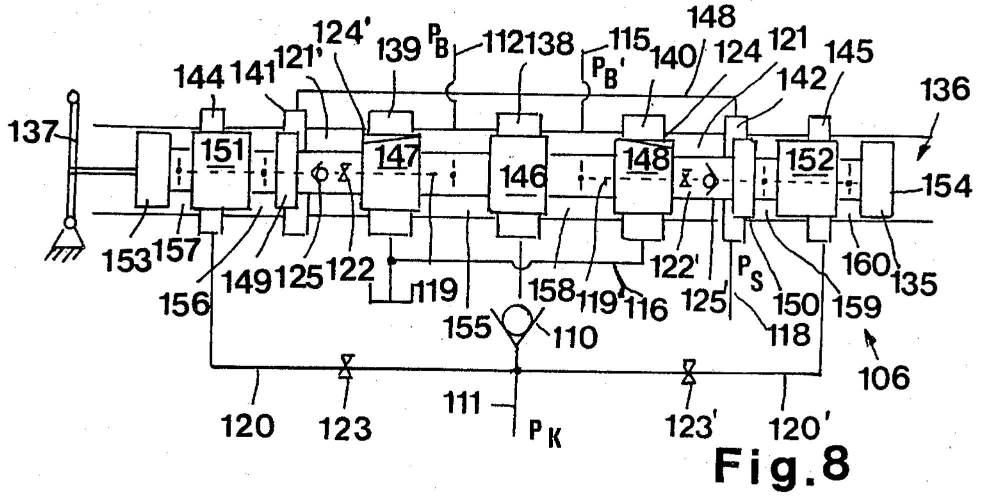
FIG. 8 shows a first embodiment of double-acting control valve means.

FIG. 8 diagrammatically shows one embodiment of double-acting control valve means, the reference numerals employed being greater by 100 compared with FIG. 1. They comprise an axial slide 135 which can be displaced from the illustrated neutral position towards both sides in a bore 136 with the aid of setting apparatus 137 which is shown only diagrammatically. The setting apparatus may also operate electrically, pneumatically, hydraulically or in some other way. The bore has a central annular groove 138, to which the connecting conduit 111 is connected. To both sides thereof, there are the connections for the consumer conduits 112 and 115. To both sides thereof onthe ouside there are two return annular grooves 139 and 140 connected to the return conduit 116. To both sides thereof on the outside there is a respective signal annular groove 141 and 142 connected under one another by way of a conduit 143 and to the signal conduit 118. Still further on the outside, there are two switching annular grooves 144 and 145. The axial slide 135 has a central collar 146 blocking the central annular groove 138 to both sides in the neutral position. Following this at both sides, there is a respective return collar 147 and 148 which, in the neutral position, block the return grooves 139 and 140 from the adjacent consumer conduit 112 or 115 and, towards the opposite side, have a converging cross-section, for example one or more oblique axial grooves, in order to form the third throttles 124 and 124' in this way. Outside same to both sides thereof there are signal collars 149 and 150 which, in the neutral position, block the signal annular grooves 141 and 142 from the respective outer side of the bore 136. These are followed by limiting collars 151 and 152 as well as end collars 153 and 154. In the axial slide 135 there are two passages 119 and 119' forming two first connecting branches. The first passage 119 connects a groove 155 between the central collar 146 and the return collar 147 to a groove 156 between the signal collar 149 and limiting collar 151, as well as a groove 157 between the last mentioned collar and the end collar 153. The first throttle 122 and the check valve 125 are located in the first part of this passage 119. Similarly, the second passage 119' connects the grooves 158, 159 and 160.

If the axial slide 135 is displaced to the right out of the illustrated neutral position, the grooves 156 and 157 come into communication with the signal annular groove 141 and the switching annular groove 144, respectively. This means that the first connecting branch 119 as well as the second connecting branch 120 are connected to the signal conduit 118. Since the annular groove 121' between the return collar 147 and the signal collar 149 is separated from the signal annular groove 141, only the annular groove 121 with the throttle 124 is still connected to the signal conduit 118 as a third connecting branch. Upon displacement in the opposite direction, the hitherto operative throttles 122, 123 and 124 are separated and the three throttles 122', 123' and 124' are made operative.

Figure 9:
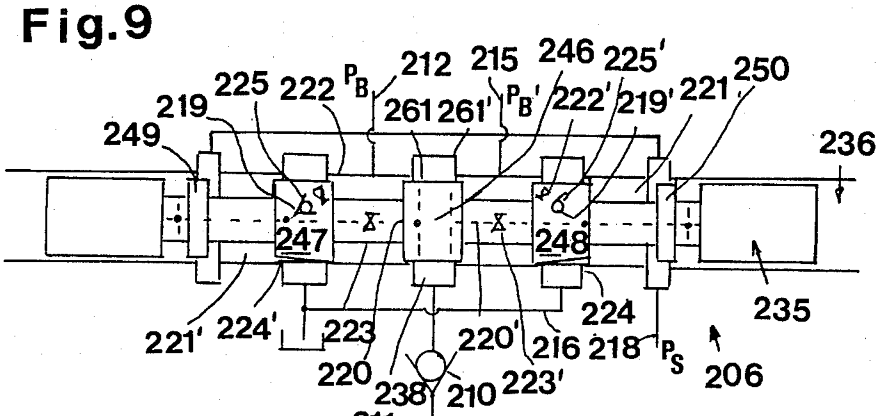
FIG. 9 shows a second embodiment of double-acting control valve means.

In the embodiment of FIG. 9, corresponding parts are designated by reference numerals increased by 200 in relation to FIG. 1 and by 100 in relation to FIG. 2. The main difference from FIG. 8 resides in the fact that the second connecting branch is formed by an extension 220 of the passage 219 or by an extension 220' of the passage 219', which have inlet orifices 261 or 261' at the periphery of the central collar 246 arranged so that in the neutral position they still lie just within the width of the central annular groove 238. Upon displacement out of the neutral position, therefore, the one or other extension 220 or 220' is made inoperative. In this way, all parts of the two pressure dividing arrangements are accommodated in the axial slide 235. An outer switching annular groove operated by a switching collar can therefore be dispensed with.

Figure 10:
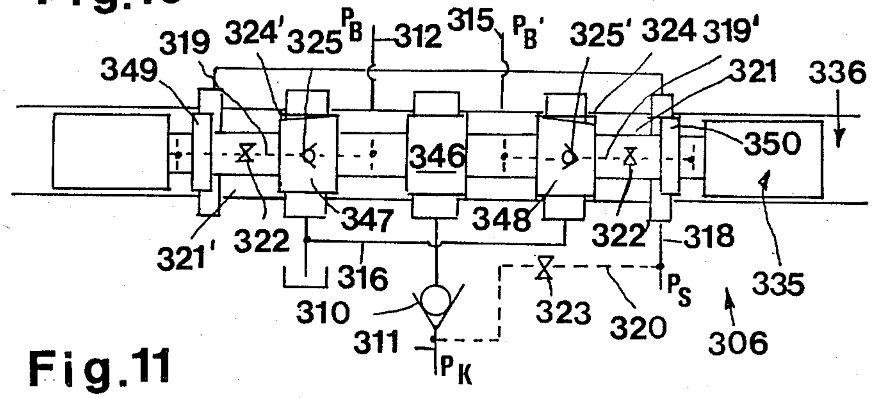
FIG. 10 shows a third embodiment of double-acting control valve means.

In the FIG. 10 embodiment, reference numerals are employed which start at 300. In this case, a second connecting branch 320 common to both pressure dividing arrangements is permanently disposed between the connecting conduit 311 and the signal conduit 318. The construction of the slide is correspondingly simplified.

Figure 11:
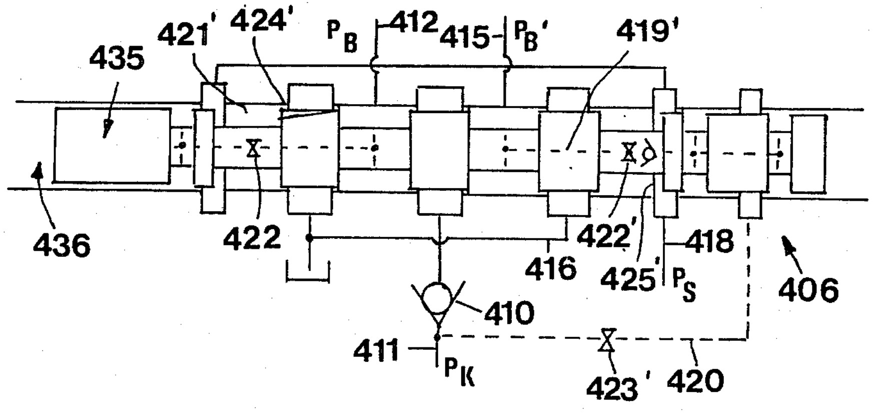
FIG. 11 shows a fourth embodiment of double-acting control valve means.

In the FIG. 11 embodiment, reference numerals are employed which start at 400. In this case, a pressure dividing arrangement with the three throttles 422', 423' and 424' is provided only for the one control direction, namely movement of the axial slide 435 to the left. This corresponds to one of the parts of the FIG. 8 construction. For control to the other side, only the throttle 422 is provided whereas connections in the sense of the second and third connecting branches are omitted. In this direction, therefore, there is only load-sensing regulation.

If the throttle is to have a fixed value, for example the throttle 22, it is sufficient to select the dimensions of the inner cross-section of the connecting path 19 correspondingly. For example, in FIG. 8 one can choose the cross-section for the passage 119 or 119' so that an adequate throttling resistance is provided. No separate throttle insert is therefore necessary.

Instead of the illustrated axial slides it is also possible to use rotary slides as the control valve means. The third throttle 24 need not be provided at a collar of the axial slide but can be installed in the bore. Alternatively, one can also use a separate throttle valve which is connected to the axial slide.

We claim:

1. A control unit for hydraulically operated consumer having two operating ports, comprising inlet and outlet lines connectable to said consumer, inlet and outlet valve means respectively in said lines, pump means for supplying pressurized fluid to said inlet line, pressure regulating means at the outlet of said pump means having spring means acting thereon for controlling the output pressure thereof, a signal conduit having first and second branches connected to said inlet line on opposite sides of said inlet valve means and a third branch connected to said outlet line on the downstream side of said outlet valve means, said signal conduit means being connected to and acting on said pressure regulating means in the same sense as said spring means, said signal conduit second branch being connected to and acting on said pressure regulating means oppositely from said spring means, and three throttle means respectively in said branches to form a pressure dividing arrangement.

2. A control unit according to claim 1 characterized in that said throttle mean in said third branch being adjustable together with said inlet and outlet valve means but in the opposite sense thereto.

3. A control unit according to claim 1 wherein check valve means is in said first branch which opens in the direction of said inlet line.

4. A control unit according to claim 1 including double-acting control valve means by which said inlet and outlet lines are alternately connectable to said consumer operating ports.

5. A control unit according to claim 4 including two of said pressure dividing arrangements.

6. A control unit according to claim 5 wherein said pressure regulating means is operable in both directions, said second branch being a common branch in said two pressure dividing arrangements.

* * * * *